(12) United States Patent
Gooijer et al.

(10) Patent No.: US 8,197,293 B2
(45) Date of Patent: Jun. 12, 2012

(54) MOORING ASSEMBLY

(75) Inventors: Lambert Erik Gooijer, Amstelveen (NL); Huibert Van Tol, Hoofddorp (NL); Michiel Cornelis Kloosterboer, Haarlem (NL); Pieter Cornelis Burger, Zoetermeer (NL)

(73) Assignee: Bluewater Energy Services B.V., Hoofddorp (NL)

( * ) Notice: Subject to any disclaimer, the term of this patent is extended or adjusted under 35 U.S.C. 154(b) by 303 days.

(21) Appl. No.: 12/504,088

(22) Filed: Jul. 16, 2009

(65) Prior Publication Data
US 2010/0012010 A1 Jan. 21, 2010

(30) Foreign Application Priority Data
Jul. 17, 2008 (EP) .................................... 08160604

(51) Int. Cl.
*B63B 22/02* (2006.01)
(52) U.S. Cl. .......................................................... 441/5
(58) Field of Classification Search ................... 441/5
See application file for complete search history.

(56) References Cited

U.S. PATENT DOCUMENTS

| | | | |
|---|---|---|---|
| 4,677,930 A | 7/1987 | Ortloff | |
| 5,240,446 A | 8/1993 | Boatman | |
| 5,316,509 A | 5/1994 | Boatman | |
| 5,356,321 A | 10/1994 | Boatman | |
| 5,372,531 A | 12/1994 | Boatman | |
| 5,515,804 A | 5/1996 | Pollack | |
| 6,164,233 A * | 12/2000 | Pollack et al. | 114/230.12 |
| 6,315,625 B1 * | 11/2001 | Braud | 441/5 |

FOREIGN PATENT DOCUMENTS

EP 1849701 10/2007

OTHER PUBLICATIONS

Official Search Report of the European Patent Office in counterpart foreign application No. EP 08160604.8 filed Jul. 17, 2008.

* cited by examiner

*Primary Examiner* — Stephen Avila
(74) *Attorney, Agent, or Firm* — Steven M. Koehler; Westman, Champlin & Kelly, P.A.

(57) ABSTRACT

A mooring assembly for a vessel comprises a receiving vessel part, a geostationary part received rotatably in said receiving vessel part and a main bearing assembly connecting the geostationary part to the receiving vessel part. The main bearing assembly comprises at least two separate bearings which are manipulable such that the one or the other or both bearings are in an operative position, thus allowing the non-operative bearing to be replaced, overhauled, repaired and alike in situ.

18 Claims, 8 Drawing Sheets

MOORING ASSEMBLY

BACKGROUND

The discussion below is merely provided for general background information and is not intended to be used as an aid in determining the scope of the claimed subject matter.

Aspects of the invention relate to a mooring assembly for a vessel, comprising a receiving vessel part, a geostationary part received rotatably in said receiving vessel part and a main bearing assembly connecting the geostationary part to the receiving vessel part.

As known generally, such a mooring assembly allows a vessel to weathervane around a geostationary part (e.g. turret). The main bearing assembly transfers the main loads from the geostationary part towards the receiving vessel part and thus towards the vessel, and vice versa, while allowing the rotation between the geostationary part and the vessel.

It is noted, that, sometimes, such a mooring assembly also may comprise additional, auxiliary bearing assemblies which, however, are intended to transfer only a part of the (main) loads between the vessel and the geostationary part. Aspects of the present invention are directed to the main bearing assembly which, essentially, transfers almost the entire load between the vessel and geostationary part.

The main bearing assembly in such a mooring assembly often is a critical item. Therefore a very high reliability of the main bearing assembly is essential. Typically a roller bearing is used as main bearing for its proven reliability. Nowadays, when such a main bearing assembly, or critical parts thereof, are damaged and should be replaced or repaired, complicated operations are needed, amongst which transferring the combination of vessel and geostationary part, after disconnecting the mooring lines, to another location, for example in sheltered water or a shipyard. However, such operations are highly undesirable, basically because of the very costly loss of production time (such a mooring assembly primarily is used at a production location, for example at an offshore oil field or gas field). Alternatively, the geostationary part may be supported temporarily on station by auxiliary devices, but this most likely will severely hinder or completely prevent weathervaning of the vessel during repair/overhaul/replacement of the main bearing.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the present invention is a mooring assembly with a main bearing assembly comprising at least two separate bearings which are manipulable such that the one or the other or both bearings are in an operative position.

A first one of the bearings is in an operative position during normal operation of the mooring assembly. When said first bearing has to be replaced or overhauled, it is manipulated into a non-operative position, whereas the second one of said bearing is manipulated to its operative position. Such a manipulation is possible without transferring the combination of vessel and geostationary part to a different location. Further such a manipulation of the first and second bearings allows the mooring assembly, and especially its main bearing assembly, to remain operative all the time. This is a major advantage because no or only a neglectable loss of production time is caused during the replacement or overhauling of said first bearing. The production of oil or gas may be continued without interruption or may be continued immediately after the load transfer from the first toward the second bearing.

In an embodiment of the mooring assembly only one bearing is manipulable. When said only one bearing is manipulated for changing its operational state (operative/non-operative), automatically also the operational state of the other bearing may be changed without directly manipulating it. It is noted, however, that it also may be possible to manipulate the said only one bearing in such a manner that its operational state is changed without changing the operational state of the other bearing (for example creating a situation in which both bearings are operative).

It is possible too, that at least one of the bearings is removable from the mooring assembly. Removing such bearing basically will occur when said bearing is in a non-operative position (that means non-loaded). Removing the bearing may allow a better inspection, replacement, repair etcetera of said bearing or critical parts thereof. Further it allows the mooring assembly to operate with only one bearing installed (the removable bearing being absent); when the installed bearing has to be replaced/overhauled the removable bearing can be installed and manipulated to its operative position (such that the bearing already present is brought into its non-operative position).

There are several options for implementing aspects of the present invention. For example, the two separate bearings may be positioned one above the other. However, it is also possible that the two separate bearings are positioned concentrically one aside the other. The specifics of such an implementation may depend on various factors, such as constructional details of the geostationary part and receiving vessel part, bearing diameter, load combination, demands of the user, etcetera.

When, in accordance with an embodiment of the mooring assembly, both bearings substantially are of equal quality, the main bearing assembly can operate equally well with the one or the other bearing in an operative position. When the bearing (or a critical part thereof) which is initially operative, is damaged, the other bearing may be used until it is damaged too. This doubles the effective life of the mooring assembly without carrying out any repairs etcetera. However, it is also possible to carry out any repairs, overhauling of the bearing damaged first when the other bearing has come into operation, and so on.

However, it is possible too that one bearing is of less quality than the other bearing. In such a mooring assembly the bearing having the best quality is used during normal operation of the mooring assembly (and will define the so-called primary bearing). When said bearing has to be replaced/overhauled the bearing of less quality (secondary bearing) is manipulated into its operative position and will be used until the primary bearing has been replaced/overhauled, after which the secondary bearing again is manipulated into its non-operative position while the primary bearing is made operative again. Therefore, such a secondary bearing only will be used temporarily for a relative short period of time, whereas the bearing having better quality is used during a prolonged period of time.

It should be noted, however, that also in the case that both bearings substantially are of equal quality, one of such bearings could be used temporarily during the time needed for replacing/overhauling the other bearing.

It is noted that the phrase 'quality' should be considered in a broad sense, also including, for example, 'load capacity'.

In accordance with yet another embodiment of the mooring assembly, each bearing comprises a first bearing part connected to the geostationary part and a cooperating second bearing part connected to the receiving vessel part, wherein the manipulation of a bearing involves disconnecting at least one of said first and second bearing parts from the geostationary part or receiving vessel part, respectively, in a load transmitting sense.

When, for example, the first bearing part of a bearing is disconnected from the geostationary part, no load can be transmitted from the geostationary part to said first bearing part, and consequently said bearing is not operative. In such a situation the other bearing will be operative. The same applies for disconnecting the second bearing part from the receiving vessel part.

In a special embodiment of the mooring assembly disconnecting at least one of said first and second bearing parts of a first one of said bearings from the geostationary part or receiving vessel part, respectively, in a load transmitting sense may occur through amending the distance between at least one of said first and second bearing parts of the second one of said bearings and the geostationary part or receiving vessel part, respectively.

Amending the distance between at least one of said first and second bearing parts of the second one of said bearings and the geostationary part or receiving vessel part, respectively, means that said second bearing is manipulated into its operative position whereas the first bearing then is manipulated into its non-operative position.

Amending said distance may occur through a member with adjustable height positioned between a first or second bearing part and the geostationary part or receiving vessel part, respectively. Such a member, for example, may have wedge-shaped parts which are movable relative to each other under influence of an activating means, such as, for example, a bolt or a hydraulic/pneumatic actuator.

Preferably the bearings are roller bearings. That means that between the first bearing part and second bearing part (which, basically, define bearing tracks) rollers are positioned.

However, aspects of the present invention may be practiced with all known kinds of bearings. The choice of the respective bearing will depend on design criteria.

In an embodiment the geostationary part is a turret and the receiving vessel part is a moonpool.

In yet another embodiment the receiving vessel part is positioned outside of the hull of the vessel, such as, for example, in an outrigger (or so-called external turret system).

Finally it is possible to replace the vessel by a fixed off-shore construction.

BRIEF DESCRIPTION OF THE DRAWINGS

Hereinafter aspects of the invention will be elucidated while referring to the drawings, in which exemplary embodiments of the mooring assembly are illustrated.

DETAILED DESCRIPTION OF THE ILLUSTRATIVE EMBODIMENTS

Figure 1:
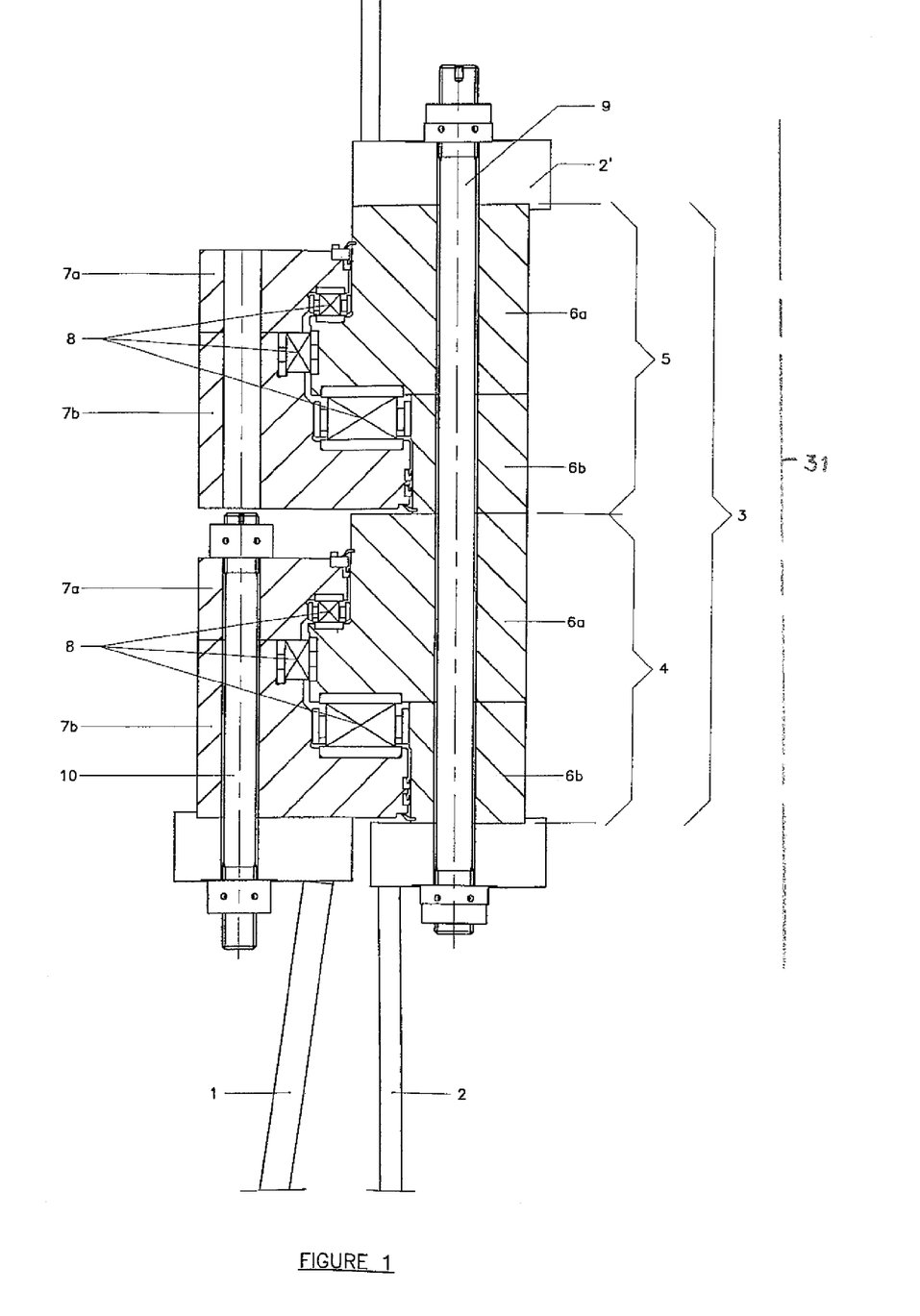
FIG. 1 shows, partly and in a longitudinal section, a first embodiment of a mooring assembly at its main bearing area in a first position.

Firstly, reference is made to FIG. 1. A mooring assembly for a vessel comprises a moonpool of which part of a casing 1 is illustrated. A turret 2 (of which only a small part is illustrated and which can also be considered herein as a geostationary part) is positioned rotatably in said moonpool. As is known in the art, the turret 3 can include conduits (not shown) for carrying fluids for transferring to and from the vessel. US Published Patent Application 2007/0155259, the contents of which are incorporated herein by reference in its entirety, illustrates an exemplary form of such conduits.

A main bearing assembly 3 rotatably connects the turret 2 to the casing (vessel receiving part) 1. The main bearing assembly 3 comprises two separate bearings, a first bearing 4 and a second bearing 5. In the embodiment illustrated in FIGS. 1 and 2 said bearings 4 and 5 are positioned one above the other.

The main bearing assembly 3 allows the vessel 1 to weathervane about an axis of rotation 31 around the turret 2. The main bearing assembly 3 transfers the main loads comprising a radial component and a component along the axis of rotation 31 from the geostationary part 2 towards the receiving vessel 1 part and thus the vessel 1, and vice versa, while allowing the rotation between the turret 2 and the vessel 1 about an axis of rotation 31.

At this point, it should be understood aspects herein described can be used in other applications such as where the receiving vessel part is positioned outside of the hull of the vessel, such as, for example, in an outrigger (or so-called external turret system). Likewise, it is possible to use the aspects herein described in an application where the vessel is replaced with a fixed off-shore construction.

Figure 2:
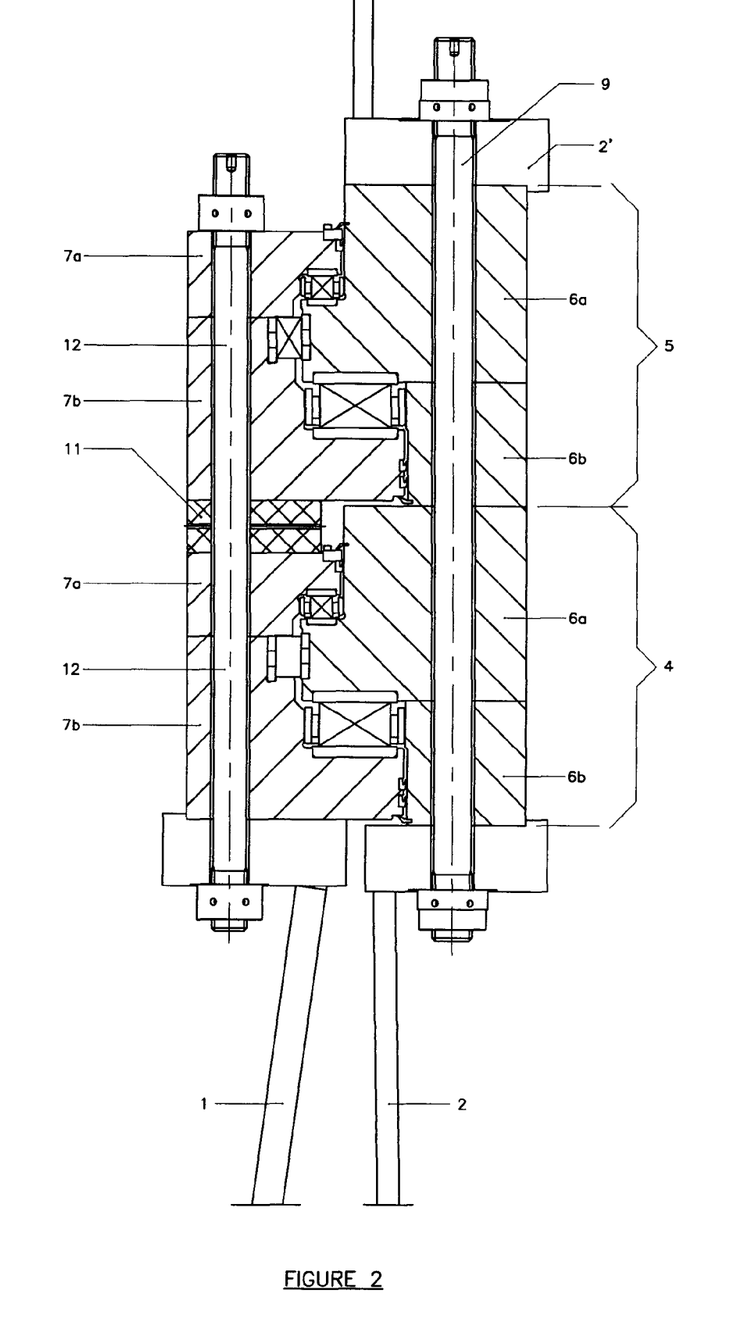
FIG. 2 shows the mooring assembly of FIG. 1 in a second position.

The first bearing 4 and second bearing 5 basically have a similar construction, comprising inner ring sections 6a and 6b and outer ring sections 7a and 7b (these ring sections may be taken apart for disassembling a bearing, as is known per se). As shown, bearing members 8 (for example rollers or balls) are positioned between the inner ring sections 6a,6b and outer ring sections 7a,7b. The bearings 4,5, thus, may have a conventional construction.

The inner ring sections 6a,6b of the first bearing 4 and of the second bearing 5 are attached to the turret 2 by means of an appropriate tensioning member 9. Typically, the turret 2 (geostationary part) is extended upwards by a so-called turntable (see FIGS. 3 and 4, reference 2') of which only a small part is illustrated on top of the bearing assembly 3 (as known per se). It, however, is not necessarily positioned on top of the bearing assembly 3, but can also be positioned directly on top of the turret 2 forming part of the geostationary part. In such an embodiment, the turntable will be supported through a construction inside the geostationary parts of the bearing assembly.

In FIG. 1 the outer ring sections 7a,7b of the first (lower) bearing 4 are attached to the casing 1 by means of an appropriate tensioning member 10. The outer ring sections 7a,7b of the second (upper) bearing 5 are not attached to the casing 1. Thus, in the situation illustrated in FIG. 1 the lower bearing 4 is in an operative position supporting the turret 2. No load will be transmitted through the second bearing 5 between the turret and the casing (vessel).

In case the lower bearing 4 has to be deactivated, a distance member 11 is positioned between outer ring section 7b of the second bearing 5 and outer ring section 7a of the first bearing 4 (FIG. 2). The dimensions (especially height) of the distance member 11 are such, that, once installed by means of a tensioning member 12, all loads from the turret 2 towards the casing 1 are transmitted through the second (upper) bearing 5, whereas the first (lower) bearing 4 is not, or not substantially, loaded anymore.

Thus, in such a situation the lower bearing 4 is not operative. This arrangement may be considered as a redundant bearing assembly having limited effect on surrounding constructions.

The distance member 11 may comprise a member with adjustable height, of which the height, once positioned between the upper bearing 5 and lower bearing 4, is adjusted such, that the upper bearing 5 will assume its operative position (by lifting the outer ring sections 7a,7b relative to the inner ring sections 6a,6b) and the lower bearing 4 will assume its non-operative position (by slightly lifting the turret 2 such that inner ring sections 6a,6b of the lower bearing 4 are slightly lifted relative to the corresponding outer ring sections 7a,7b).

It is noted, that in the situation according to FIG. 2 in which the second (upper) bearing 5 is in its operative position, loads transmitted from the turret 2 through the second bearing 5 also are transmitted through the outer ring sections 7a, 7b of the first (lower) bearing 4 towards the casing 1. However, no loads are transmitted between said outer ring sections 7a,7b of the lower bearing 4 and the inner ring sections 6a,6b of said lower bearing 4. For this purpose it is considered that the radial rollers of said lower bearing 4 are removed through methods known per se.

It is noted further, that in the embodiment illustrated in FIGS. 1 and 2 both bearings 4 and 5 are constructed in a similar manner, thus basically are of equal quality.

In the embodiment illustrated in FIGS. 1 and 2 the bearings 4 and 5 comprise inner ring sections 6a, 6b of which the position relative to the turret 2 does not change. For manipulating the bearing assembly 3, however, the position of the outer ring sections 7a,7b of the upper bearing 5 is changed by amending the distance between said outer ring sections 7a,7b and the casing 1 (i.e. by means of the distance member 11).

Figure 3:
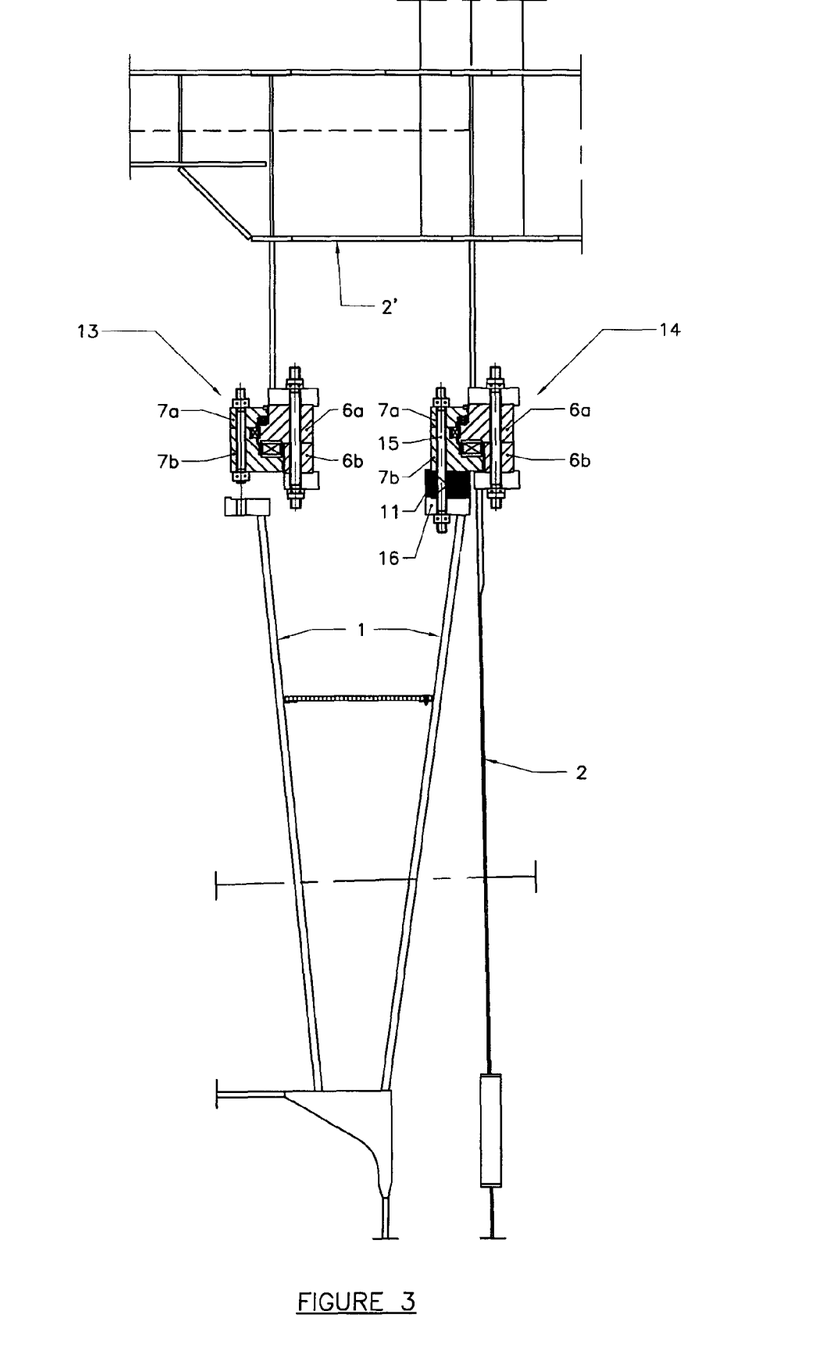
FIG. 3 shows, partly and in a longitudinal section, a second embodiment of a mooring assembly in a first position.
Figure 4:
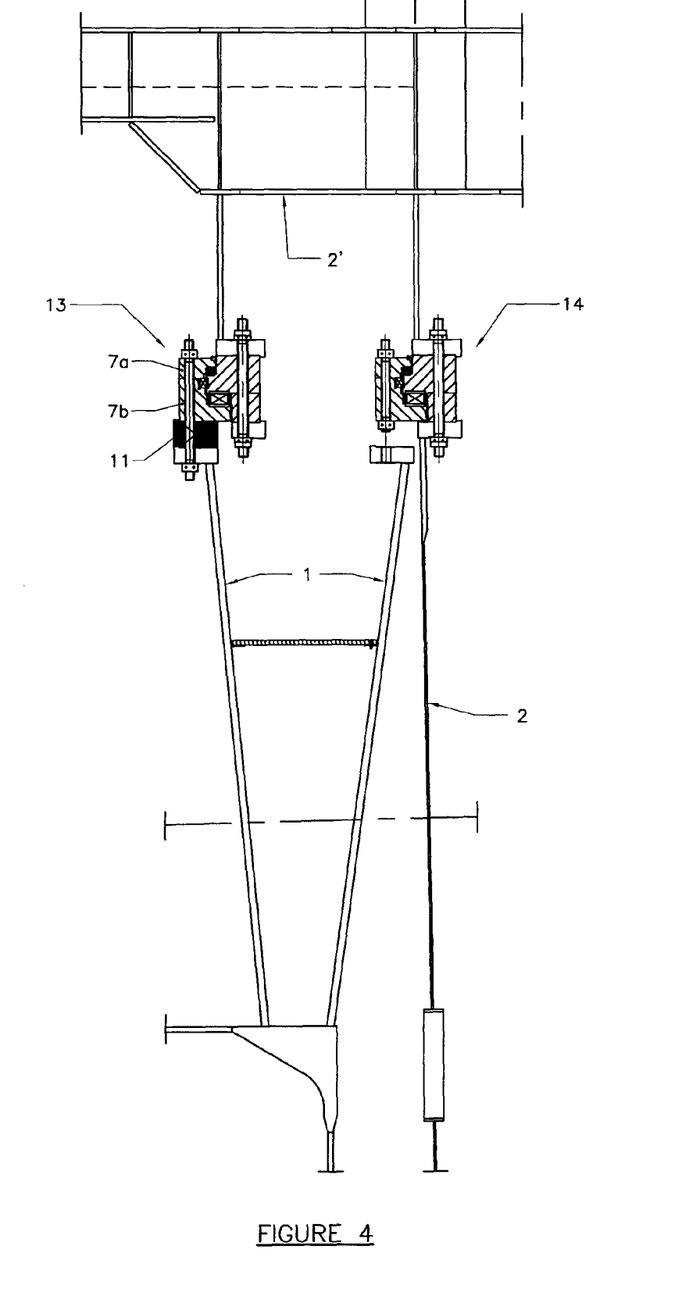
FIG. 4 shows the mooring assembly of FIG. 3 in a second position.

Referring to FIGS. 3 and 4, an embodiment of a mooring assembly is illustrated in which two bearings 13 and 14 are positioned concentrically one aside the other. In FIG. 3 the outer bearing 13 comprises inner ring sections 6a,6b connected to the turret 2 (top construction also may be part of the previously mentioned, so-called turntable construction) and outer ring sections 7a,7b which, in FIG. 3, are disconnected from the casing 1. Therefore bearing 13 is in a non-operative position not transferring any loads between the turret 2 and casing (vessel) 1.

Inner ring sections 6a,6b of the inner bearing 14 likewise are connected to a part of the turret 2, whereas outer ring sections 7a, 7b of said inner bearing 14 are connected to the casing 1 through a distance member 11. Therefore, in the situation shown in FIG. 3 the inner bearing 14 is operative. In such a situation the outer bearing 13 may be replaced/repaired, when needed.

In FIG. 4 a situation has been illustrated in which now inner bearing 14 is non-operative and outer bearing 13 is operative. Now a distance member 11 is positioned between the outer ring sections 7a, 7b of the outer bearing 13 and the casing 1. The distance member 11 below inner bearing 14 has been removed.

The distance members 11 illustrated in FIGS. 3 and 4 may be of a type having a variable height. When going from the situation illustrated in FIG. 3 to the situation illustrated in FIG. 4, distance member 11 does remain in place between the inner bearing 14 and casing 1 until the distance member 11 between the outer bearing 13 and the casing 1 is installed completely. Both bearings shall be operative, even if only for a temporary situation (in-between state). However, a tensioning member 15 extending through outer ring sections 7a, 7b of inner bearing 14 and through distance member 11 and a connecting part 16 of the casing 1 should be removed or brought into a position with increased length for allowing an upward motion of the outer ring sections 7a,7b of the inner bearing 14 when a distance member 11 is positioned between the outer bearing 13 and the casing 1 (or, if such a distance member 11 is already present between outer bearing 13 and casing 1, when the height of such a distance member is increased).

The bearings which are non-operative in FIG. 3 and FIG. 4 may be replaced/repaired in an appropriate manner.

Also in the embodiment illustrated in FIGS. 3 and 4 both bearings 13 and 14 are illustrated as similar bearings having an equal quality. It is possible, however, that one of said bearings is of less quality (secondary bearing) and is only used temporarily when the other (primary) bearing is repaired or replaced.

In FIGS. 3 and 4, the upper part 2' defines a turntable as mentioned previously.

FIG. 5 shows another embodiment of a mooring assembly. FIGS. 5a-d show the load transfer from the primary bearing toward the secondary bearing, i.e. in four different positions. Firstly referring to FIG. 5a, a lower bearing 16 is shown having inner ring sections 6a, 6b attached to the turret 2 by a tensioning member 17. A tensioning member 18 connects outer ring sections 7a, 7b to the casing 1. A mounting ring 19 is positioned on top of the outer ring sections 7a,7b. In FIG. 5a the lower bearing 16 is operative in connecting the turret 2 rotatably to the casing (vessel) 1.

Figure 5A:
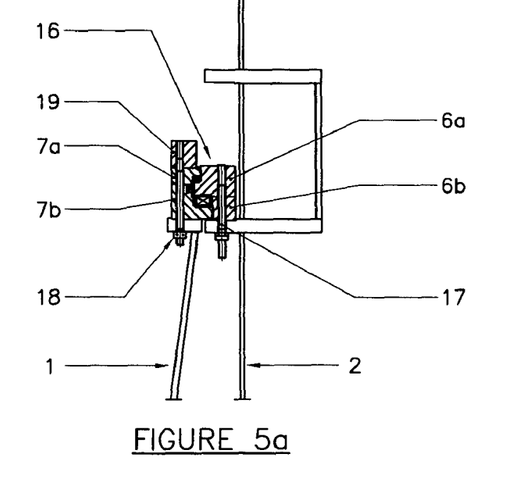
FIGS. 5a-5d show, partly and in a longitudinal section, a third embodiment of a mooring assembly in four different positions.
Figure 5B:
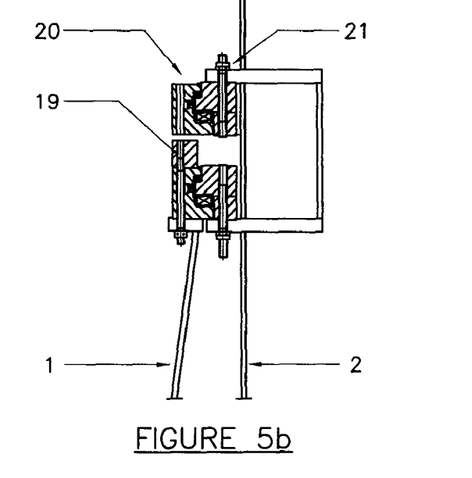

FIG. 5b shows a situation, in which an upper bearing 20 is attached to the turret 2 through a tensioning member 21.

Figure 5C:
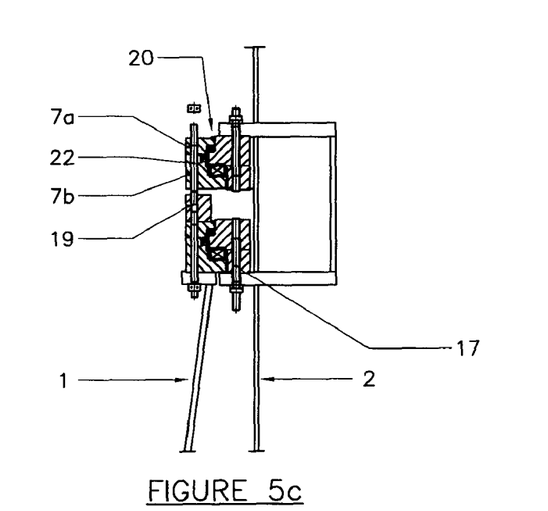

In FIG. 5c tensioning member 22 is inserted into mounting ring 19 through outer ring sections 7a,7b of the upper bearing 20; the nut is not yet applied.

Figure 5D:
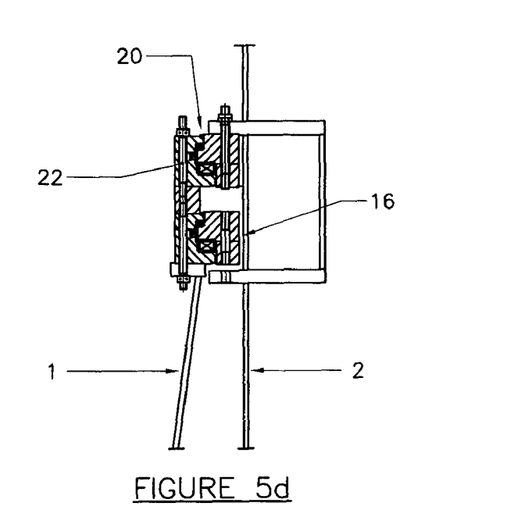

Finally FIG. 5d shows a situation, in which tensioning member 22 has been tensioned after tensioning member 17 (FIG. 5c) has been gradually loosened and then removed. As a result, outer ring sections 7a, 7b of upper bearing 20 rest upon the mounting ring 19 which rests upon outer ring sections 7a, 7b of the lower bearing 16 which, finally, are connected to the casing 1. As a result, in FIG. 5d lower bearing 16 is non-operative (because there is no longer a connection between the inner ring sections 6a, 6b thereof and the turret 2) whereas the upper bearing 20 now is operative and transfers any loads between the turret 2 and casing (vessel) 1.

FIG. 5 therefore shows an embodiment, in which the upper bearing 20 is removable. Removable also means, that such upper bearing 20 does not need to be present in the mooring assembly during normal operation.

FIG. 6 shows a slightly different embodiment of the mooring assembly in five different situations. FIG. 6a shows a normal operational situation, in which an upper bearing 23 is operative and a lower bearing 24 is not operative (because its inner ring sections are not attached to the turret 2 yet). The lower bearing 24 is connected to the casing and the upper bearing 23 is connected to the lower bearing 24 with tensioning members 26.

Figure 6A:
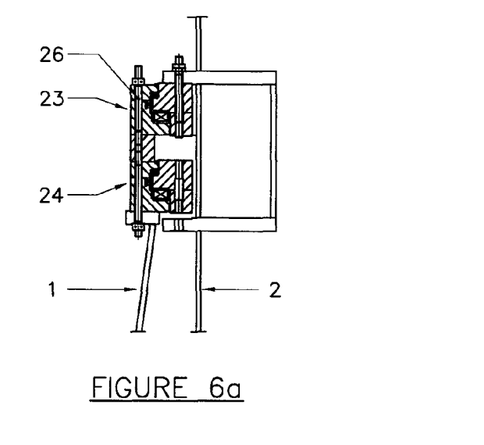
FIGS. 6a-6e show, partly and in a longitudinal section, a fourth embodiment of the mooring assembly in five different positions.
Figure 6B:
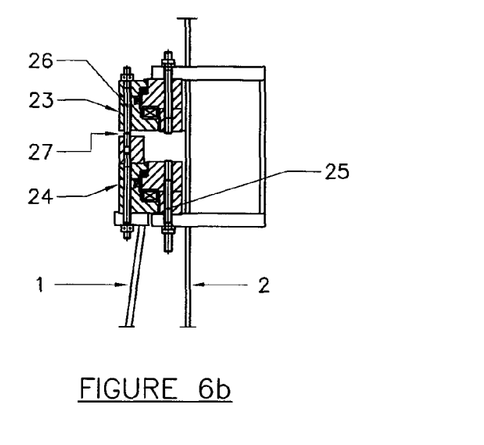

FIG. 6*b* shows a situation, in which the inner ring sections of the lower bearing 24 are connected to the turret 2 by means of tensioning member 25 whereas a tensioning member 26 (FIG. 6*b*) has been loosened sufficiently to create a gap 27 between the lower bearing 24 and upper bearing 23.

Figure 6C:
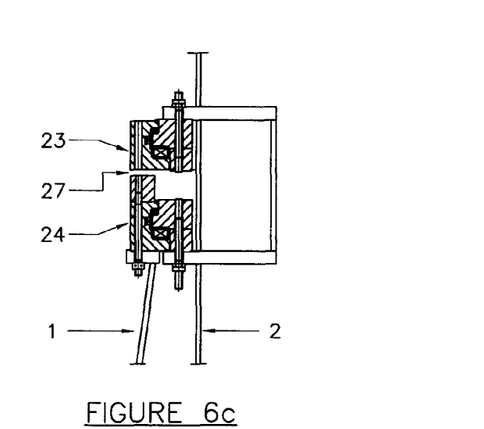

FIG. 6*c* shows the next step, in which tensioning member 26 (FIG. 6*b*) has been removed such that the upper bearing 23 (or critical parts thereof) may be removed/repaired/replaced.

Figure 6D:
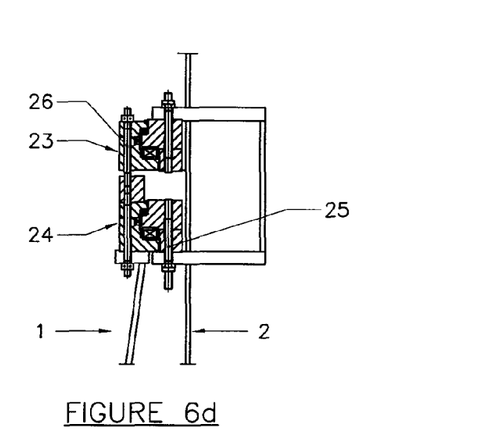
Figure 6E:
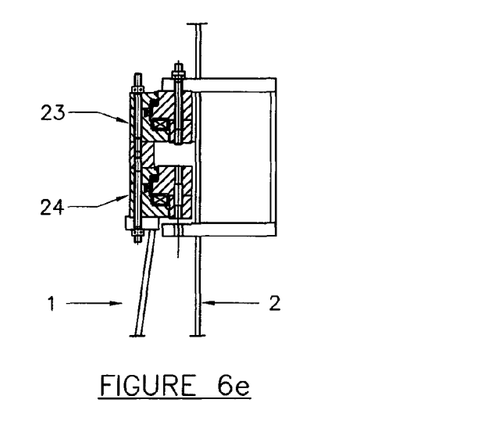

In FIG. 6*d* the tensioning member 26 is reinstalled and, finally, FIG. 6*e* shows that the tensioning member 26 is tensioned again and tensioning member 25 is removed, such that again the situation according to FIG. 6*a* is reached.

In FIGS. 6*a* and 6*e* the upper bearing 23 is operative, whereas in FIG. 6*b-d* the lower bearing 24 is operative.

Figure 7:
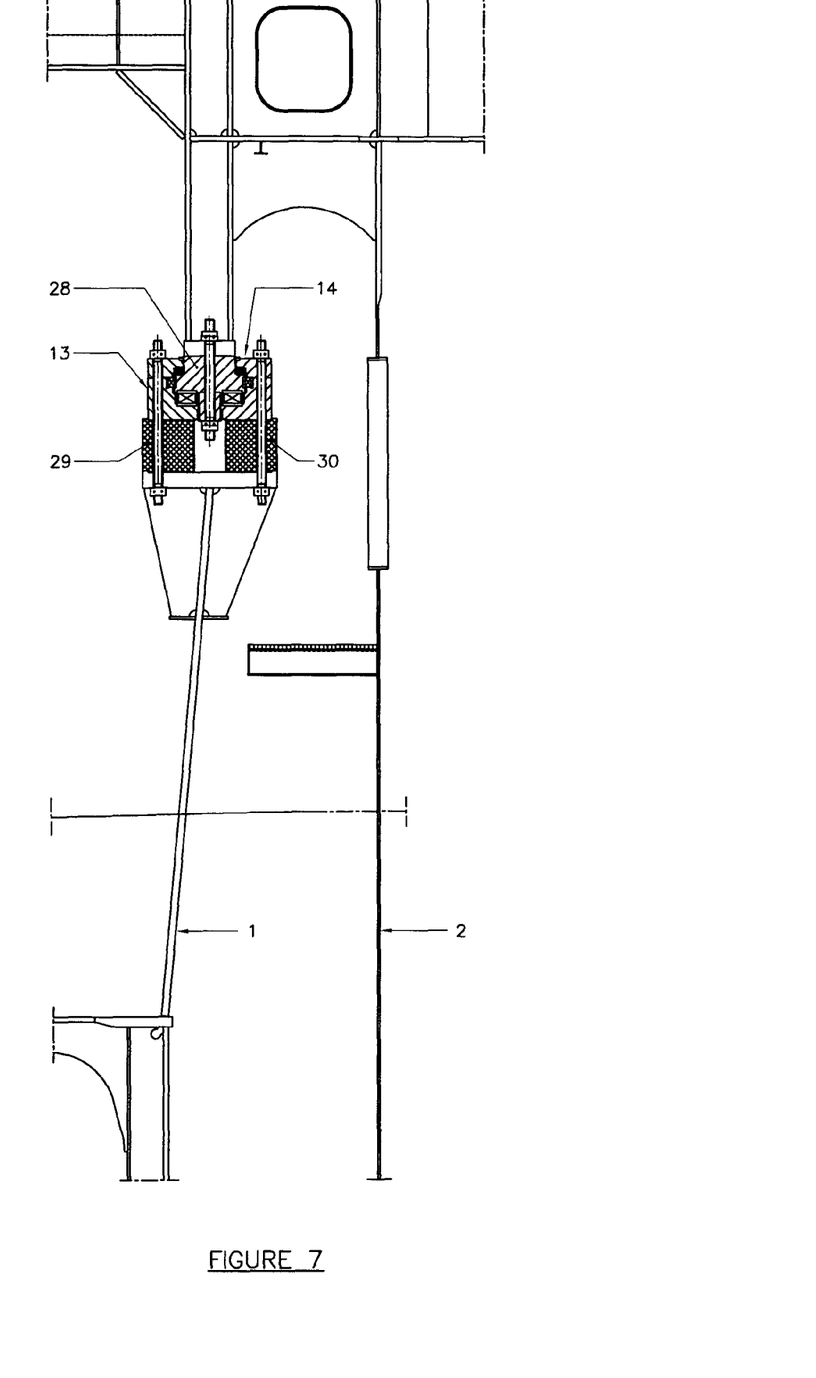
FIG. 7 shows, partly and in a longitudinal section, a fifth embodiment of a mooring assembly in a first position.

FIG. 7 shows an embodiment which resembles the embodiment according to FIGS. 3 and 4, but wherein the outer bearing 13 and inner bearing 14 have parts which are combined into a single unitary ring 28. Distance members 29 and 30 are provided having the same function as distance members 11 in the embodiment according to FIGS. 3 and 4.

Figure 8:
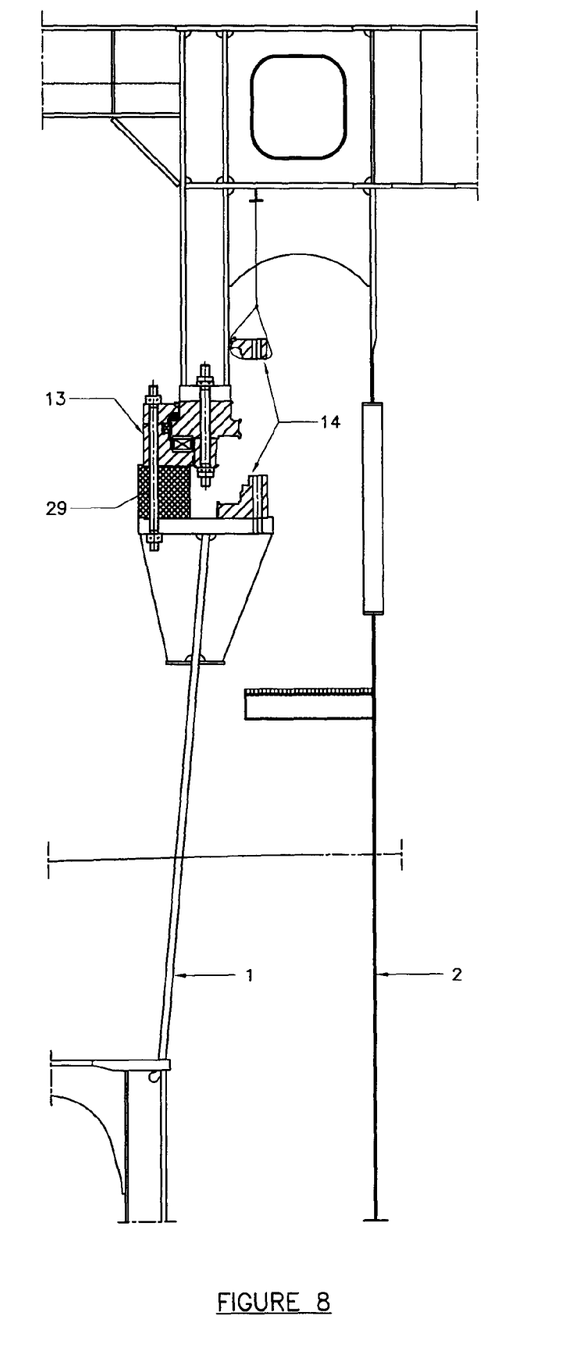
FIG. 8 shows the mooring assembly of FIG. 7 in a second position.

FIG. 7 shows a special situation, in which the distance members 29 and 30 are shaped such, that both the outer and inner bearing 13 and 14, respectively are operative. In FIG. 8 only the outer bearing 13 is operative, whereas a part of the inner bearing 14 is in the process of being removed.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A mooring assembly for a vessel, comprising:
a receiving vessel part,
a geostationary part, and
a main bearing assembly connecting the geostationary part to the receiving vessel part to carry both a radial load and a load along the axis of rotation between the receiving vessel part to the geostationary part while allowing rotation of the receiving vessel part around the geostationary part, the main bearing assembly comprising at least a first bearing and a second bearing separate from the first bearing, wherein the first bearing and the second bearing are manipulable into a first configuration wherein the first bearing is in an operative position to carry both the radial load and the load along the axis of rotation between the receiving vessel part and the geostationary part while allowing rotation of the receiving vessel part around the geostationary part and the second bearing is in an inoperative position and does not carry the radial load or the load along the axis of rotation between the receiving vessel part to the geostationary part, wherein the first bearing and the second bearing are manipulable into a second configuration wherein the second bearing is in an operative position to carry both the radial load and the load along the axis of rotation between the receiving vessel part to the geostationary part while allowing rotation of the receiving vessel part around the geostationary part and the first bearing is in an inoperative position and does not carry the radial load or the load along the axis of rotation, and wherein the the first bearing and the second bearing are manipulable into a third configuration wherein the first bearing and the second bearing members are in operative positions to carry both the radial load and the load along the axis of rotation between the receiving vessel part to the geostationary part while allowing rotation of the receiving vessel part around the geostationary part.

2. The mooring assembly according to claim 1, wherein at least one of the first and second bearings is removable from the mooring assembly.

3. The mooring assembly according to claim 1, wherein the first and second bearings are positioned one above the other with respect to the axis of rotation.

4. The mooring assembly according to claim 1, wherein the first and second bearings are positioned concentrically one aside the other with respect to the axis of rotation.

5. The mooring assembly according to claim 1, wherein both bearings substantially are of equal quality, in a load transmitting sense.

6. The mooring assembly according to claim 1, wherein first bearing is of less quality then the second bearing, in a load transmitting sense.

7. The mooring assembly according to claim 1, wherein each of the first and second bearings comprises a first bearing part connected to the geostationary part and a cooperating second bearing part connected to the receiving vessel part, wherein each of the first and second bearings are configured to be selectively manipulated such that at least one of said first and second bearing parts is disconnected from the geostationary part or receiving vessel part, respectively, in a load transmitting sense.

8. The mooring assembly according to claim 7, wherein each of the first and second bearings are configured to be selectively manipulated such that wherein disconnecting at least one of said first and second bearing parts of a first one of said first and second bearings from the geostationary part or receiving vessel part, respectively, in a load transmitting sense occurs through amending a distance between at least one of said first and second bearing parts of a second one of said first and second bearings and the geostationary part or receiving vessel part, respectively.

9. The mooring assembly according to claim 8, wherein amending said distance occurs through a member with adjustable height positioned between a first or second bearing part and the geostationary part or receiving vessel part, respectively.

10. The mooring assembly according to claim 7, wherein the first bearing is positioned above the second bearing with respect to the axis of rotation, and wherein in the operative position of the first bearing, the second bearing part ring of the first bearing is supported by the receiving vessel part through the second bearing part of the second bearing.

11. The mooring assembly according to claim 7, wherein the first and second bearings are positioned concentrically one aside the other with respect to the axis of rotation, and wherein the first bearing parts of both bearings are combined into a single unitary first bearing part.

12. The mooring assembly according to claim 7, wherein the first and second bearings are positioned concentrically one aside the other with respect to the axis of rotation, and wherein the second bearing parts of both bearings are combined into a single unitary second bearing part.

13. The mooring assembly according to claim 1, wherein the first and second bearings comprise roller bearings.

14. The mooring assembly according to claim 1, wherein the geostationary part is a turret and the receiving vessel part is a moonpool.

15. The mooring assembly according to claim 1, wherein the receiving vessel part is positioned outside the hull of the vessel.

16. The mooring assembly according claim 1, and used in a fixed off-shore construction.

17. A vessel having a mooring, the mooring comprising:
a receiving vessel part,
a geostationary part, and
a main bearing assembly connecting the geostationary part to the receiving vessel part to carry a load comprising a radial component and a component along an axis of rotation between the receiving vessel part and the geostationary part while allowing rotation of the receiving vessel part around the geostationary part, the main bearing assembly comprising at least a first bearing and a second bearing separate from the first bearing, wherein the first and second bearings are positionable into three load bearing configurations where in a first configuration only the first bearing is in an operative position to carry the load comprising the radial component and the component along an axis of rotation between the receiving vessel part to the geostationary part while allowing rotation of the receiving vessel part around the geostationary part and the second bearing does not carry any load, wherein in a second configuration only the second bearing is in an operative position to carry the load comprising the radial component and the component along an axis of rotation between the receiving vessel part to the geostationary part while allowing rotation of the receiving vessel part around the geostationary and the first bearing does not carry any load, or a third configuration wherein both the first and second bearings are in an operative position to carry the load comprising the radial component and the component along an axis of rotation between the receiving vessel part to the geostationary part while allowing rotation of the receiving vessel part around the geostationary part.

18. An assembly for transferring fluid comprising:
a first part,
a second part received rotatably in said first part, the second part having conduits for carrying fluid, and
a main bearing assembly connecting the second part to the first part and carrying a load comprising a radial component and a component along an axis of rotation between the first part and the second part that allows rotation of the first part around the second part, the main bearing assembly comprising at least a first bearing and a second bearing separate from the first bearing, wherein in a first operating state the first bearing comprises at least one surface that is configured to carry substantially more or all of said load comprising the radial component and the component along an axis of rotation between the first part and the second part so as to allow rotation of the first part around the second part and the second bearing is configured carry little if any of said load comprising the radial component and the component along an axis of rotation, and wherein in a second operating state the second bearing comprising at least one surface that is configured to carry substantially more or all of said load comprising the radial component and the component along an axis of rotation between the first part and the second part so as to allow rotation of the first part around the second part and the first bearing is configured carry little if any of said load comprising the radial component and the component along an axis of rotation.

* * * * *